United States Patent [19]

Klemen

[11] Patent Number: 4,976,670
[45] Date of Patent: Dec. 11, 1990

[54] POWER TRANSMISSION
[75] Inventor: Donald Klemen, Carmel, Ind.
[73] Assignee: General Motors Corporation, Detroit, Mich.
[21] Appl. No.: 360,675
[22] Filed: Jun. 2, 1989
[51] Int. Cl.⁵ .............................................. F16H 57/10
[52] U.S. Cl. ..................................... 475/278; 475/280; 475/303; 475/330
[58] Field of Search .................. 74/758, 759, 760, 761, 74/762, 763, 339, 340; 192/53 E, 53 F; 475/330, 275, 279, 290, 280, 281, 291, 303, 278

[56] References Cited
U.S. PATENT DOCUMENTS

| 3,705,521 | 12/1972 | Smith | 74/759 |
| 3,820,418 | 6/1974 | Ott | 475/280 |
| 4,046,031 | 9/1977 | Ott et al. | 475/280 |
| 4,089,239 | 5/1978 | Murakami et al. | 475/280 X |
| 4,228,697 | 10/1980 | Miller | 475/281 X |
| 4,238,888 | 8/1977 | Murakami et al. | 475/280 X |
| 4,395,925 | 8/1983 | Gaus | 74/762 X |
| 4,653,348 | 3/1987 | Hiraiwa | 74/763 X |
| 4,660,439 | 4/1987 | Hiraiwa | 74/762 X |
| 4,674,346 | 6/1987 | Hiraiwa | 74/339 |
| 4,744,267 | 5/1988 | Lepelletier | 475/280 X |
| 4,836,041 | 6/1989 | Falzoni et al. | 74/339 |

Primary Examiner—Leslie A. Braun
Assistant Examiner—Benjamin Levi
Attorney, Agent, or Firm—Donald F. Scherer

[57] ABSTRACT

A power transmission has a planetary gear arrangement controlled by a plurality of selectively engageable clutches and brakes to provide forward and reverse speed ratios. A selectively operable input gear arrangement is utilized to establish a negative ratio of substantially 1:1 between the transmission input and the planetary gear arrangement. The selective use of the negative ratio input permits substantially equal forward and reverse drive ratios. The negative ratio input arrangement also permits extended coverage when employed with some of the other forward ratios established by the planetary gear arrangement.

5 Claims, 2 Drawing Sheets

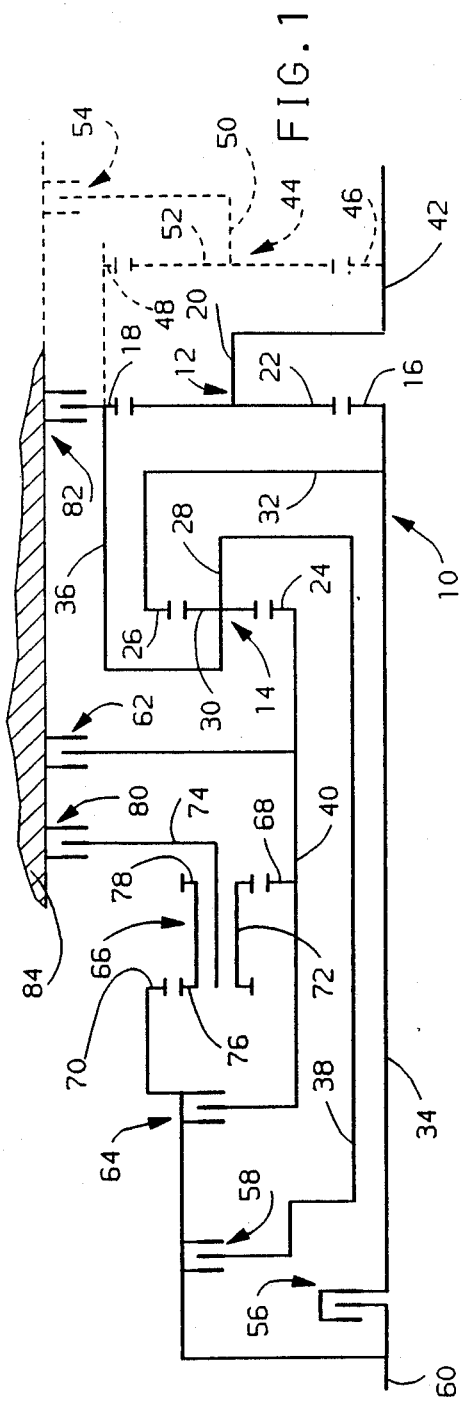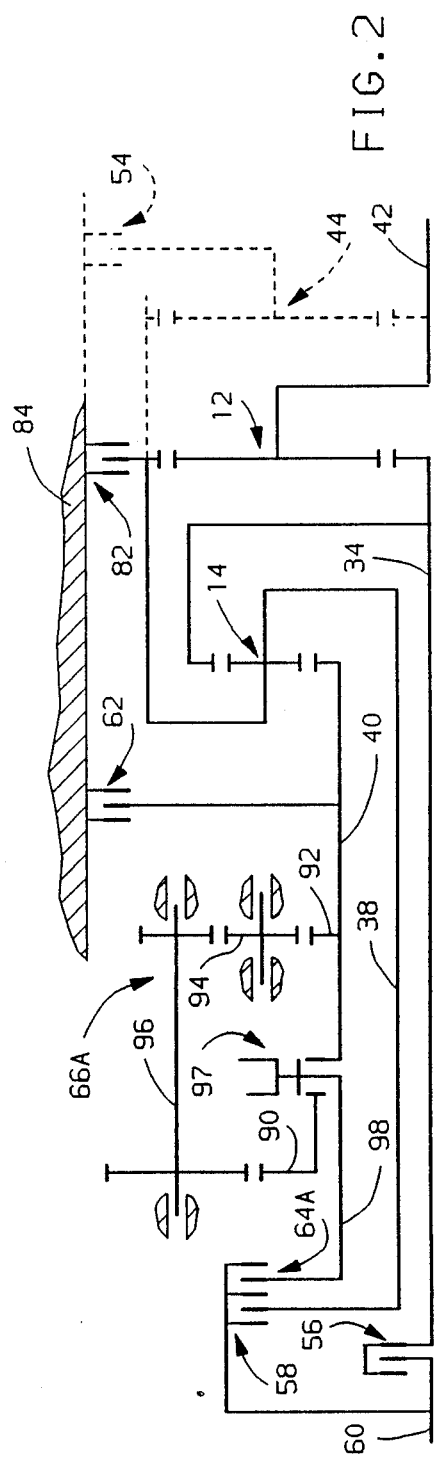

POWER TRANSMISSION

BACKGROUND OF THE INVENTION

This invention relates to power transmissions and more particularly to planetary gear power transmissions having a substantially equal forward and reverse gear ratio.

SUMMARY OF THE INVENTION

It is an object of this invention to provide an improved power transmission having a low forward drive ratio substantially equal to a low reverse drive ratio.

It is another object of this invention to provide an improved multi-speed power transmission having an input gear train for establishing a speed reversal input drive to a planetary gear mechanism which cooperates therewith to establish a forward speed ratio between the input and output members of the transmission.

It is yet another object of this invention to provide an improved multi-speed power transmission as described in the preceding object wherein the speed reversal gear train is utilized during at least three forward speed ratios and also wherein the lowest forward speed ratio is substantially equal to a reverse speed ratio.

These and other objects and advantages of the present invention will be more readily apparent from the following description and drawings.

DESCRIPTION OF THE DRAWINGS

FIGS. 1 through 4 are schematic representations of power transmission gear arrangements incorporating the present invention.

DESCRIPTION OF EXEMPLARY EMBODIMENTS

Figure 3:
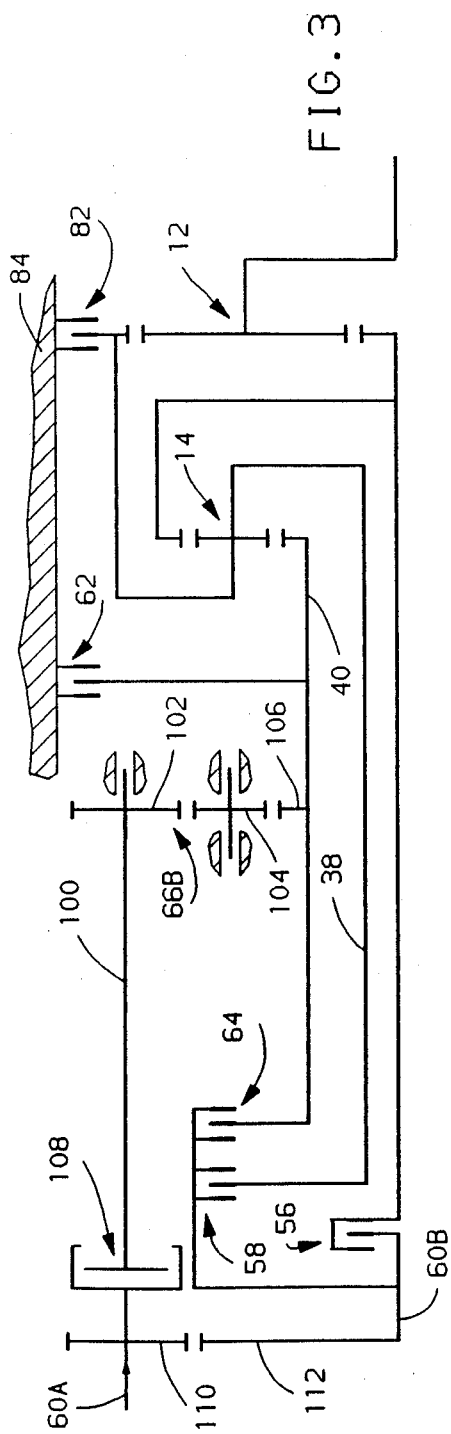

Referring to the drawings, wherein like characters represent the same or corresponding parts throughout the several views, there is seen in FIG. 1 a planetary gear arrangement, generally designated 10, which is comprised of two simple planetary gear units 12 and 14. The planetary gear unit 12 has a sun gear 16, a ring gear 18 and a planet carrier 20, on which is rotatably mounted a plurality of pinion gears 22 meshing with the sun gear 16 and ring gear 18. The planetary gear unit 14 includes a sun gear 24, a ring gear 26 and a planet carrier 28 which has rotatably supported thereon a plurality of pinion gears 30 which mesh with the sun gear 24 and ring gear 26. The sun gear 16 and ring gear 26 are interconnected by a hub 32 which, in turn, is connected to a planetary input shaft 34.

The carrier 28 and ring gear 18 are interconnected by a hub 36 and are also drivingly connected with a planetary input shaft 38. The sun gear 24 is drivingly connected with another planetary input shaft 40. The planetary carrier 20 of gear unit 12 is drivingly connected to a transmission output shaft 42 which is adapted to provide a rotary drive for a vehicle, not shown.

An additional planetary gear arrangement 44 is shown in dashed lines and includes a sun gear 46, a ring gear 48 and a planet carrier 50 on which is rotatably supported pinion gears 52 meshing with the sun gear 46 and ring gear 48. The carrier 50 of planetary arrangement 44 is operatively connected with a selectively engageable brake 54. The sun gear 46 is drivingly connected with the output shaft 42 and the ring gear 48 is drivingly connected to the ring gear 18.

The planetary arrangement 44 is shown in dashed lines because it is an optional gear which will permit a "deep low" gear ratio and a "deep reverse" ratio. The planetary input shafts 34 and 38 are operatively connected with respective clutch arrangements 56 and 58. The clutch arrangements 56 and 58 are drivingly connected with a transmission input shaft 60. The planetary input shaft 40 is operatively connected to a brake 62 and a clutch 64. The clutch 64 is drivingly connected with the transmission input shaft 60. The transmission input shaft 60 is drivingly connected to a torque converter and engine, not shown.

A reverse gear or negative unity mechanism 66 is operatively connected between the transmission input shaft 60 and the planetary input shaft 40. The reverse gear mechanism 66 includes a sun gear 68 which is drivingly connected with the planetary input shaft 40, a ring gear 70 which is drivingly connected with the input shaft 60, a plurality of pinion gears 72 which are rotatably mounted on a carrier 74. The pinion gears 72 have a first toothed portion 76 meshing with the ring gear 70 and a second toothed portion 78 meshing with the sun gear 68. The planet carrier 74 is connected with a selectively operable friction brake 80.

The ring gear 18 and planet carrier 28 are selectively controllable by a friction brake 82. The friction brakes 54, 62, 80 and 82 are conventional units which are preferably selectively fluid operated to connect respective gear members to a stationary portion of the transmission housing 84.

When using the optional planetary gear arrangement 44, this transmission will provide eight forward gear ratios and two reverse gear ratios. The lowest forward gear ratio is established by the selective engagement of brakes 80 and 54. When the brake 80 is engaged, the reverse gear mechanism 66 will cause the input rotation of the transmission input shaft 60 to be reversed prior to causing rotation of the planetary input shaft 40. The reverse gear mechanism 66 is sized to provide a substantially 1:1 negative gear ratio between the transmission input shaft 60 and the planetary input shaft 40. With the planetary input shaft 40 rotating opposite to the input shaft 60 and the brake 54 engaged, the output shaft 42 will rotate in the same direction as the input shaft 60 but at a greatly reduced speed and increased torque. For example, if gears 70, 76, 78 and 68 have teeth 81, 23, 13 and 45, respectively, a negative or reverse ratio of 1.017 will result.

To establish the maximum reverse ratio, the brake 54 is engaged while the clutch 64 is engaged, and the remaining clutches and brakes are disengaged. With the clutch 64 engaged, the planetary input shaft 40 will rotate in the same direction as the transmission input shaft 60. With the planetary shaft 40 rotating in the forward direction and the brake 54 engaged, the output shaft 42 will rotate opposite or in the reverse of the input shaft 60 at a reduced speed and increased torque. Since the planetary input shaft 40 rotates at essentially the same value during these two ratios, the output shaft 42 will also rotate at the same numeric values relative to the transmission input shaft 60 during these ratios.

The first forward speed ratio is established by the engagement of brake 80 and brake 82. With these devices engaged, the planetary input shaft 40 will drive the sun gear 24 in a direction opposite to the rotation of shaft 60. Since the carrier 28 is stationary, the ring gear 26 will rotate in a forward direction driving with it the sun gear 16, which in turn will cause forward rotation of the carrier 20 and therefore output shaft 42.

The reverse ratio is obtained by engaging the clutch 64 and brake 82 while the other clutches and brakes are disengaged. In this reverse ratio, the shaft 40 is driven forwardly. The forward rotation of shaft 40 will cause reverse rotation of ring gear 26 and therefore sun gear 16, which will result in reverse rotation of output shaft 42.

The only difference between the first forward ratio and the reverse ratio is the use of the reverse gear mechanism 66 which, as previously explained, is substantially 1:1. Therefore, the first forward ratio and the reverse ratio will be substantially equal in numeric value.

The second forward ratio is established by disengaging brake 80 and engaging clutch 56. With clutch 56 and brake 82 engaged, the planetary gear arrangement 12 will provide a reduced forward speed ratio.

To establish the third forward speed ratio, the brake 82 is disengaged while the brake 80 is engaged. With the brake 80 engaged, the shaft 40 will be driven opposite to the engine or transmission input shaft 60. This will permit the carrier 28 and therefore ring gear 18 to rotate forwardly thereby increasing the speed of output shaft 42 relative to the second ratio.

The fourth forward ratio is established by engaging the brake 62 and disengaging the brake 80. With the brake 62 engaged, and the ring gear 26 driven forwardly, the planet carrier 28 and therefore ring gear 18 will be driven forwardly at a speed ratio greater than that accomplished in the third ratio which will result in a higher speed ratio to the output shaft 42.

To establish the fifth forward speed ratio, the clutch 58 is engaged while the brake 62 is disengaged. Since both clutches 58 and 56 are connected to both planetary gear arrangements 12 and 14, a 1:1 ratio is established between the transmission input shaft 60 and the transmission output shaft 42.

To establish the sixth forward speed ratio, the brake 62 is engaged while the clutch 56 is disengaged. With these friction devices engaged, an overdrive ratio is established in the planetary gear arrangement 14 which is imposed on the ring gear 26 and therefore sun gear 16. The ring gear 18 is driven at the same speed as the input shaft 60 and the sun gear 16 is driven faster than the input shaft 60 resulting in an overdrive ratio to the output shaft 42.

To establish the seventh forward speed ratio, the brake 80 is engaged while the brake 62 is disengaged. With these friction devices established, the sun gear 24 is driven in a direction opposite to the input shaft 60. This results in a higher overdrive ratio being established in the planetary gear arrangement 14. It should be appreciated that a higher overdrive ratio at planetary gear arrangement 14 will result in an increase in the speed of sun gear 16 and therefore output shaft 42.

The power transmission arrangement shown in FIG. 2 utilizes the same planetary gear arrangements 12 and 14 as those utilized in FIG. 1, and therefore has the same clutches 56 and 58 and the same brakes 62 and 82 associated therewith. A reverse gear mechanism 66A is utilized in FIG. 2 which replaces the reversing gear arrangement 66 in FIG. 1.

The reverse gear mechanism 66A has an input gear 90 and an output gear 92. These gears 90 and 92 are interconnected by a reverse idler 94 and a transfer countershaft 96. The gear 92 is drivingly connected with the planetary shaft 40. The gear 90 is selectively connectible through a synchronizer clutch 97 with a transfer shaft 98, which in turn is connectible with the transmission input shaft 60 through a friction clutch 64A. The synchronizer clutch 97 is also movable to selectively connect the shaft 98 with the planetary input shaft 40.

The synchronizer clutch 97 is moved leftward to connect gear 90 with shaft 98 during low, first, third and seventh gear ratios, and is moved to the right to connect shaft 98 with shaft 40 during the reverse and low reverse ratios. The clutch 64A is engaged in the low forward, first, third and seventh ratios, and in the low reverse and reverse ratios. The remaining clutches and brakes are engaged to establish the same ratios, as explained above for FIG. 1.

The power transmission shown in FIG. 3, includes the same planetary gear arrangements 12 and 14, as described for FIGS. 1 and 2, but has omitted therefrom the optional planetary unit 44. If additional ratio coverage is desired, the optional planetary unit can be included.

The gear arrangement shown in FIG. 3 has a reverse or negative unity gear mechanism 66B which includes an input shaft member 100, an input gear 102, an idler gear 104 and an output gear 106. The input shaft 100 is drivingly connected with a selectively engageable friction clutch 108 which is also drivingly connected with a transmission input shaft 60A. The transmission input shaft 60A is drivingly connected through a pair of transfer gears 110 and 112 to an input shaft 60B, which is drivingly connected with the clutches 56, 58 and 64.

The power transmission arrangement in FIG. 3 will provide seven forward speed ratios and one reverse speed ratio. The clutch 108 is engaged during the first, third and seventh forward speed ratios, such that the reverse gear arrangement 66B is utilized to provide an input drive to the planetary gear set 14. The remaining clutches and brakes are engaged, as described above, for FIG. 1 to establish the seven forward drive ratios and the reverse ratio. The reverse ratio provided by gears 102 and 106 is substantially equal to the ratio provided by the transfer gears 110 and 112.

Figure 4:
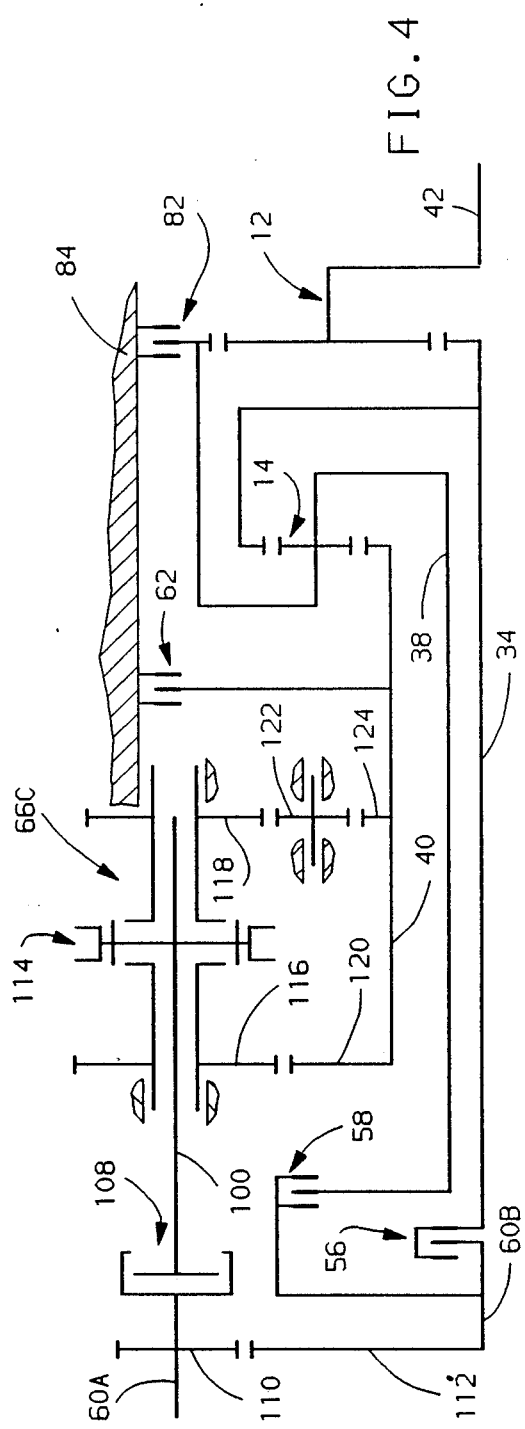

The power transmission shown in FIG. 4 is very similar to that shown in FIG. 3, with the exception that a reverse gear unit 66C replaces the reverse gear unit 66B. The reverse gear unit 66C includes a synchronizer clutch assembly 114 which is selectively operable to connect the input shaft 100 to a forward input gear 116 and a reverse input gear 118.

The forward input gear 116 is drivingly connected through a transfer gear 120 to the planetary input shaft 40, and the reverse input gear 118 is drivingly connected through an idler gear 122 and a transfer gear 124 to the planetary input shaft 40. The synchronizer clutch 114 essentially replaces the friction clutch 64 of FIG. 3. For the first, third and seventh forward gear ratios, the synchronizer clutch 114 is moved rightward to connect the shaft 100 with the gear 118 and for the reverse gear ratio, the synchronizer clutch 114 is moved leftward to connect the gear 116 with the input shaft 100.

The clutch 108 is engaged during first, third and seventh forward ratios and during the reverse ratio. The remaining clutches and brakes are engaged to establish the gear ratios within the transmission, as described previously.

Each of the friction clutches and brakes is preferably a disc type unit which is engaged by a fluid operated piston, such devices are well known. Also, the control of such units is understood by those skilled in the art.

Likewise, the synchronizer clutch units 96 and 114 are conventional mechanisms which may be constructed in accordance with any of the currently available mechanisms which are known to provide this function.

It should be appreciated that the first forward ratio and the reverse ratio in each of the power transmissions described herein are substantially identical with the exception of the reversing gear unit utilized for the forward ratio. It should also be appreciated that this same reversing gear unit provides input drives for the planetary gear arrangement 14 during the seventh forward speed ratio. By utilizing the reversing ratio during the third and seventh forward speed ratios, additional ratio coverage is provided which is useful in establishing smooth acceleration of a vehicle from a standing start to maximum vehicle speed.

It should also be noted, when the optional planetary gear 44 is utilized, the low forward ratio and the low reverse ratio are substantially identical since the only difference is the reversing gear utilization. The addition of the planetary gear set 44 increases the overall ratio coverage of the transmission and is found to be most useful in large hauling type vehicles which must be able to accelerate while carrying very heavy loads.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A power transmission providing a plurality of forward drive ratios and a reverse drive ratio comprising input means for delivering power; first, second and third selectively engageable clutch means operatively connected with said input means for receiving power therefrom; output means for delivering power from said transmission; first planetary gear means for selectively establishing drive ratios within the transmission including a first member connected to the first of said clutches, a second member connected to said output means, and a third member; second planetary gear means for selectively establishing drive ratios within said transmission including a first member connected to the second of said clutches, a second member connected to the first member of said first planetary gear means and a third member connected with the third of said clutch means and with the third member of said first planetary gear means; reverse gear means for selectively providing a negative ratio between said input means and the first member of said second planetary gear means and including a first gear member drivingly connected with said input means, a second gear member drivingly connected with said first member of said second planetary gear means and selectively engageable reverse clutch means for connecting said reverse gear means with said input means to establish the negative ratio input drive to said second planetary gear means; and first and second selectively engageable brake means cooperating with said first and second planetary gear means, said reverse gear means and said first, second and third clutch means and selectively with said reverse clutch means to establish at least two of said plurality of forward drive ratios, the at least two ratios including a lowest gear ratio.

2. The power transmission defined in claim 1 and further wherein said selectively engageable reverse clutch means includes a synchronizer clutch portion.

3. A multi-speed power transmission having a first forward gear ratio, a highest forward gear ratio and a reverse gear ratio comprising input means for delivering power; first, second and third selectively engageable clutch means operatively connected with said input means for receiving power therefrom; output means for delivering power form said transmission; first planetary gear means for selectively establishing various driver ratios within the transmission including an input member operatively connected to the first of said clutches, an output member operatively connected to said output means and an input-reaction member operatively connected with said third clutch means; second planetary gear means for selectively establishing various ratios within said transmission including a first input-reaction chamber connected to the second of said clutches, an input member connected to the input member of said first planetary gear means and a second input-reaction member connected with the third of said clutch means and with the input-reaction member of said first planetary gear means; reverse gear means for selectively providing a substantially 1:1 negative ratio between said transmission input means and the first input-reaction member of said second planetary gear means and including a first gear member, a second gear member drivingly connected with said first input-reaction member of said second planetary gear means and selectively engageable torque transmitting means to establish the negative ratio within the reverse gear means between the transmission input means and the first input-reaction member of the second planetary means; and selectively engageable brake means cooperating with said first and second planetary gear means and said first, second and third clutch means to establish a plurality of drive ratios in said transmission, said reverse gear means being selectively controlled to provide an input drive to the first input-reaction member of said second planetary gear means during at least two forward gear ratios including the first of said forward gear ratios.

4. The power transmission defined in claim 3 and further wherein the reverse gear means is selectively controlled to provide an input drive during the highest of the forward gear ratios.

5. The power transmission defined in claim 3 and further wherein the second selectively engageable clutch means is operable to control an input drive to the first input-reaction member of the second planetary gear means to provide the reverse gear ratio.

* * * * *